US012694797B2

(12) United States Patent
Lee

(10) Patent No.: US 12,694,797 B2
(45) Date of Patent: Jul. 28, 2026

(54) LEARNING PLATFORM OF OBTAINING MEMORY RETENTION RATE USING MACHINE LEARNING

(71) Applicant: Jung Yoon Lee, Seoul (KR)

(72) Inventor: Jung Yoon Lee, Seoul (KR)

( * ) Notice: Subject to any disclaimer, the term of this patent is extended or adjusted under 35 U.S.C. 154(b) by 441 days.

(21) Appl. No.: 18/216,562

(22) Filed: Jun. 29, 2023

(65) Prior Publication Data

US 2024/0296749 A1     Sep. 5, 2024

Related U.S. Application Data

(63) Continuation of application No. PCT/KR2023/007870, filed on Jun. 8, 2023.

(30) Foreign Application Priority Data

Mar. 3, 2023     (KR) ........................ 10-2023-0028631

(51) Int. Cl.
G09B 7/02          (2006.01)
G06N 3/02          (2006.01)
(52) U.S. Cl.
CPC ................. G09B 7/02 (2013.01); G06N 3/02 (2013.01)
(58) Field of Classification Search
CPC .................................... G09B 7/02; G06N 3/02
See application file for complete search history.

(56) References Cited

U.S. PATENT DOCUMENTS

2015/0196242 A1* 7/2015 Lathan ................. A61B 5/4088
                                                                    434/236
2019/0115104 A1* 4/2019 Uske ...................... G06V 40/20

FOREIGN PATENT DOCUMENTS

| KR | 10-2009-0001416 A | 1/2009 |
|----|----|----|
| KR | 10-2009-0116959 A | 11/2009 |
| KR | 10-2012-0070782 A | 7/2012 |
| KR | 10-2020-0041753 A | 4/2020 |
| KR | 10-2020-0048594 A | 5/2020 |
| KR | 10-2021-0004649 A | 1/2021 |
| KR | 10-2022-0125122 A | 9/2022 |

* cited by examiner

*Primary Examiner* — Thomas J Hong
(74) *Attorney, Agent, or Firm* — Nicholas Park

(57) ABSTRACT

The present invention relates to a learning platform to stimulate the user to review by obtaining a memory retention rate in a user using machine learning. According to an embodiment, a learning platform for obtaining a memory retention rate using machine learning comprises a memory assist server configured to generate a dataset of questions and answers including one or more questions and answers thereto. A user terminal is configured to receive the dataset of questions and answers from the memory assist server, to prepare the dataset of questions and answers in accordance with a predetermined rule for testing, and to output the prepared dataset as a test to the user. The memory assist server is configured to calculate the memory retention rate using an artificial network trained using learning data including as a feature a percentage of correct answers for the dataset of questions and answers.

4 Claims, 6 Drawing Sheets

FIG. 3

| Number | Contents ID | Correct Answers | Incorrect Answers | Step |
|--------|-------------|-----------------|-------------------|------|
| 1 | A | "a, b, c, d, e" | "f, g" | 1 |
| 2 | A | "a, b, c, d, e, f" | "g" | 2 |
| 3 | A | "a, b, c, d, e, f, g" | "" | 3 |
| 4 | B | "h, i, j, k, l, m, n" | "" | 1 |
| 5 | C | "o, p, q" | "r, s, t, u" | 1 |
| 6 | C | "o, p, q, r" | "s, t, u" | 2 |
| 7 | C | "o, p, q, r, s" | "t, u" | 3 |
| 8 | C | "o, p, q, r, s, t" | "u" | 4 |

⋮

| Number | Contents ID | Correct Answers | Incorrect Answers | Step |
|--------|-------------|-----------------|-------------------|------|
| 53 | A | "a, b, c, d, e, f, g" | "" | 1 |
| 54 | B | "h, i, j, k, l, m, n" | "" | 1 |
| 55 | C | "o, p, q, r, s" | "t, u" | 1 |
| 56 | C | "o, p, q, r, s, t, u" | "" | 2 |

| Number | Contents ID | Chapter ID | Level | Correct Answers | Incorrect Answers | Step |
|---|---|---|---|---|---|---|
| 1 | A | 1 | 1 | "a, b, c, d, e" | "f, g" | 1 |
| 2 | A | 1 | 1 | "a, b, c, d, e, f" | "g" | 2 |
| 3 | A | 1 | 1 | "a, b, c, d, e, f, g" | "" | 3 |
| 4 | A | 1 | 2 | "h, i, j, k, l, m, n" | "" | 1 |
| 5 | A | 1 | 3 | "o, p, q" | "r, s, t, u" | 1 |
| 6 | A | 1 | 3 | "o, p, q, r" | "s, t, u" | 2 |
| 7 | A | 1 | 3 | "o, p, q, r, s" | "t, u" | 3 |
| 8 | A | 1 | 3 | "o, p, q, r, s, t" | "u" | 4 |
| 26 | A | 1 | 1 | "a, b, c, d, e, f, g" | "" | 1 |
| 27 | A | 1 | 2 | "h, i, j, k, l, m, n" | "" | 1 |
| 28 | A | 1 | 3 | "o, p, q, r, s" | "t, u" | 1 |
| 29 | A | 1 | 3 | "o, p, q, r, s, t, u" | "" | 2 |

LEARNING PLATFORM OF OBTAINING MEMORY RETENTION RATE USING MACHINE LEARNING

CROSS REFERENCE TO RELATED APPLICATION

This application is a US Bypass Continuation Application of International Application No. PCT/KR2023/007870, filed on Jun. 8, 2023, which claims priority to and the benefit of Korean Patent Application No. 10-2023-0028631, filed on Mar. 3, 2023, the disclosure of which is incorporated herein by reference in its entirety.

BACKGROUND

Technical Field

The present invention relates to a learning platform and, more particularly, to a learning platform to stimulate the user to review learning materials by obtaining a memory retention rate in the user using machine learning.

Related Art

Memory (or memory ability) is a crucial factor in determining learning capability of an individual. As a result, test takers who endeavor to achieve a good result on a test within a certain period of time pay great attention to the memory ability. For example, the test may be a language proficiency test, such as Test of English as a Foreign Language (TOEFL). As another example, the test may be a college entrance exam.

As such, a variety of memorizing methods are present. Recently, an information technology (IT) based learning system has been introduced. The IT-based learning system advertises that memorization is improved from repeated reviews at a designated time period based on memory retention rate. As an example, repetitive learning tools utilizing Hermann Ebbinghaus's forgetting curve have developed.

Subtle change in a memorizing method, such as when to do a review and how repetitive learning is done, etc., greatly influences the memory retention rate. Thus, learning tools, devices, or the like that can lead to memory ability with high efficiency with respect time are in high demand.

However, as learning and testing processes are separated from each other in existing learning tools, a user may feel uncomfortable in that the user must sign in to each of a learning channel and a testing channel to undergo each process. In addition, the learning process of the existing learning tools happens to be tedious, or testing methods for checking learning progress or types of learning contents are limited. Moreover, the existing learning methods only provides a theoretically appropriate learning cycle but fail to take into consideration a memory characteristic of an actual user and a characteristic where the memory retention rate changes according to when to do a review.

SUMMARY

Embodiments of the present invention have been made in an effort to solve the above-mentioned problems. An objective of the present disclosure is to provide a learning platform for obtaining memory retention rate using machine learning where learning and testing processes are done in a single, integrated channel to provide user convenience and enhance learning efficiency.

An objective of the present disclosure is to provide an open learning platform that may associate with various contents and test formats provided by an external source or self-generated.

An objective of the present disclosure is to present a learning platform that may compute current memory retention rate of the user as a numerical value using artificial intelligence and machine learning.

An objective of the present disclosure is to provide a learning platform that may enable the user to perform metacognitive learning by providing memory retention rate of the user.

An objective of the present disclosure is to provide a learning platform that may maximize long-term memory of the user, caused by repetitive learning, based on memory retention rate in the user and stimulate the user to review learning materials by providing average memory retention rate in other users.

To resolve the above-mentioned tasks, an embodiment of the present invention provides a learning platform for obtaining a memory retention rate using machine learning. The learning platform comprises a memory assist server configured to generate a dataset of questions and answers including one or more questions and answers thereto, wherein the memory assist server is configured to calculate a memory retention rate of the dataset of questions and answers to stimulate a user of the learning platform to do a review. The learning platform may also include a user terminal configured to receive the dataset of questions and answers from the memory assist server, to prepare the dataset of questions and answers in accordance with a predetermined rule for testing, and to output the prepared dataset as a test to the user. Here, the memory assist server may be configured to train an artificial neural network using learning data including as a feature a percentage of correct answers for the dataset of questions and answers and to calculate the memory retention rate using the artificial neural network.

In an embodiment, the memory assist server may include, with respect to the dataset of questions and answers, a log data collector, a data pre-processor, and a machine learning portion. The log data collector may collect log data including 1) a content identification (ID) identifying a type of a content, 2) correct answers to the dataset of questions and answers when the test is completed, 3) incorrect answers to the dataset of questions and answers when the test is completed, and 4) a number of steps that the user has tried on the dataset of questions and answers. The data pre-processor may extract the learning data from the log data, and the machine learning portion may input the learning data to train the artificial neural network.

In an embodiment, the data pre-processor may be configured to perform extracting a first pre-processed data by filtering the log data to only obtain data points where the number of steps is identical, obtaining a second pre-processed data from the first pre-processed data, wherein second pre-processed data points in the second pre-processed data are obtained by converting the correct answers and the incorrect answers in the first pre-processed data into numbers thereof, sorting the second pre-processed data points having a same content ID into a group, and extracting the learning data including the percentage of correct answers from the grouped second pre-processed data points.

In an embodiment, the learning data may further include: i) an order R of learning trials of the dataset of questions and answers, and ii) an elapsed time T calculated by a difference between a completion time of an n-th learning trial (R) and a completion time of an (n+1)-th learning trial, wherein n is a positive integer.

In an embodiment, learning data may further include a public memory retention rate, wherein the public memory retention rate is a median of percentages of correct answers about the dataset of questions and answers by a plurality of users when the content ID and the steps are all identical, wherein each of the plurality of users indicates one who has taken the test more than once.

In an embodiment, the memory assist server may further include an input data generator generating input data about the dataset of questions and answers when the user terminal connects to the memory assist server and a memory calculator inputting the input data to the artificial neural network trained by the machine learning portion to calculate the memory retention rate.

In an embodiment, the input data may include i) an order R' of a learning trial of the dataset of questions and answers and ii) an elapsed time T' that has elapsed since a completion time of the learning trial.

According to the above-described features of the present invention, various effects including the following may be expected. However, the present invention can function without providing all the effects described below.

According to an embodiment of the present invention, provided is a learning platform for obtaining memory retention rate using machine learning where learning and testing processes are done in a single, integrated channel to provide user convenience and enhance learning efficiency.

An open learning platform according to an embodiment of the present invention may associate with various contents and test formats provided by an external source or self-generated.

A learning platform can be provided, which may compute current memory retention rate of the user as a numerical value using artificial intelligence and machine learning.

A learning platform according to an embodiment of the present invention may enable the user to perform metacognitive learning by providing memory retention rate of the user.

A learning platform according to an embodiment of the present invention may maximize long-term memory of the user, caused by repetitive learning, based on memory retention rate in the user and stimulate the user to review learning materials by providing average memory retention rate in other users.

BRIEF DESCRIPTION OF THE DRAWINGS

FIGS. 3 and 4 are an example illustration describing processes of extracting and pre-processing learning data according to an embodiment of the present invention; and FIGS. 5 and 6 are an example illustration describing processes of extracting and pre-processing learning data according to another embodiment of the present invention.

DETAILED DESCRIPTION

Example embodiments of the present disclosure are described with reference to the appended drawings to enable a sufficient understanding about elements and effects of the present disclosure. However, the present disclosure is not limited to the disclosed embodiments below. Various forms may be obtained, and various modifications can be applied. Below, in describing the present invention, explanation on related known functions may be omitted if it is determined that the known functions are well-known to one having ordinary skill in the art and may obscure essence of the present invention.

Terms, such as "first," "second," etc., may be used herein to describe various elements. However, the elements should not be understood as being limited by these terms. These terms may be only used in distinguishing one element from another. For example, a first element may be referred to as a second element, and, similarly, a second element may be referred to as a first element, within the scope of the present disclosure.

Herein, terms, such as "comprise," "include," "have," etc., are designed to indicate features, numbers, steps, operations, elements, components, or a combination thereof are present. It should be understood that presence of one or more other features, numbers, steps, operations, elements, components, or a combination thereof or a possibility of addition thereof are not excluded.

Terms used herein are only to explain certain embodiments but not to limit the present invention. A singular representation may include a plural representation unless a clearly different meaning can be grasped from the context. Unless defined differently, terms used in embodiments of the present disclosure may be interpreted as generally known terms to one having ordinary skill in the art.

Example embodiments of the present invention are described in detail with reference to the appended drawings.

Figure 1:
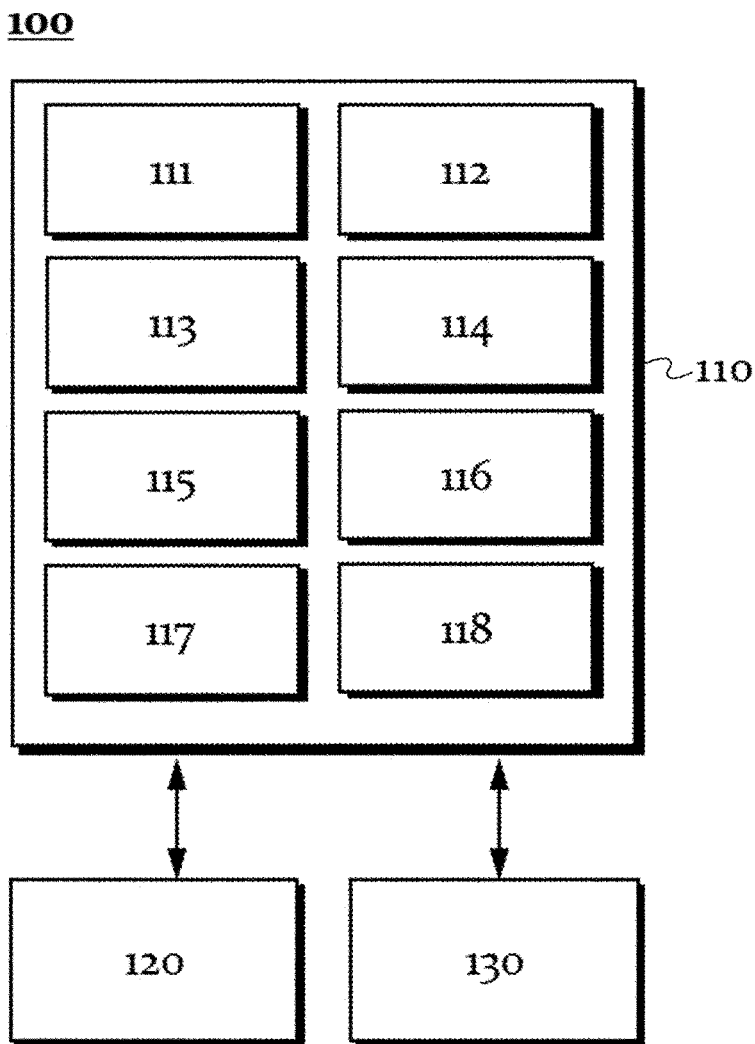
FIG. 1 is a configuration diagram of a learning platform according to an embodiment of the present invention.

FIG. 1 is a configuration diagram of a learning platform 100 according to an embodiment of the present invention. Referring to FIG. 1, the learning platform 100 may comprise a memory assist server 110, a user terminal 120, an external affiliated server 130, and the like. In an embodiment, the memory assist server 110 may comprise a log data collector 111, a data pre-processor 112, a machine learning portion 113, an input data generator 114, a calculator of memory retention rate 115, a content storage 116, a content mediator 117, a content business portion 118, and the like. Also, in an embodiment, the memory assist server 110 may include a central processing unit (CPU). The CPU may read programmable instructions for calculating a memory retention rate in a user to compute various data and implement control operation. Moreover, in an embodiment, the memory assist server 110 may include a communications portion (not shown) configured to communicate with the user terminal 120 and the external affiliated server 130.

In an embodiment, the memory assist server 110 may include a processor and a memory. The instructions executable by the processor of the memory assist server 110 are stored in the memory. In an example, the instructions may include instructions for executing the operation of the memory assist server 110 and/or the operation of each component of the memory assist server 110.

The memory of the memory assist server 110 may be a volatile memory or a non-volatile memory. As a non-limiting example, the volatile memory may be dynamic random access memory (DRAM), static random access memory (SRAM), and the like. As another non-limiting example, the non-volatile memory may be an electrically erasable programmable read-only memory (EEPROM), flash memory, magnetic RAM (MRAM), CD-ROM, DVD-ROM, or the like.

In addition, the memory of the memory assist server 110 may store a matrix, on which a calculation is to be made, included in a neural network, and may store calculation results generated through processing by the memory assist server 110.

The processor of the memory assist server 110 may execute instructions stored in the memory of the memory assist server 110. The processor of the memory assist server 110 may execute computer readable codes and instructions stored in the memory of the memory assist server 110. As a non-limiting example, the processor of the memory assist server 110 may include the CPU, a graphics processing unit, a neural processing unit, a multi-core processor, a multiprocessor, an application-specific integrated circuit (ASIC), or a field programmable gate array (FPGA).

According to some implementations of the present invention, the learning platform may also be implemented in the form of a recording medium containing instructions executable by a computer, such as program modules executed by a computer. Computer readable media may be any available media accessible by a computer and includes both volatile and nonvolatile media, and removable and non-removable media. In addition, computer readable media may include all computer storage media. Computer storage media includes both volatile and nonvolatile media, and removable and non-removable media implemented through computer readable instructions, data structures, program modules, or any method or technology for storage of information such as data.

For example, a content may include a subject matter related to learning, such as about English vocabulary. In an embodiment, the content may be provided in a form of an electronic book (e-book). The user may post, edit, or delete a review about each content using the user terminal 120.

The content may consist of chapters being a sub-category thereof. Also, the chapters may consist of levels being a sub-category thereof. For instance, at least one or more levels may constitute one chapter. Moreover, at least one or more chapters may constitute one content. Each level may include a learning material having a different degree of difficulty.

Each content may be provided with a content identification (ID) to identify a type of the content. Moreover, each chapter may be provided with a chapter identification corresponding to a sub-category of the content ID.

Memory assist server 110 may generate a dataset of questions and answers, which include one or more questions and answers to the one or more questions. In an embodiment, the dataset of questions and answers include one or more questions and answers thereto. The questions and answers may include a question suitable for memorizing a short answer and an answer to the question. For instance, each dataset of questions and answers may include 10 questions and corresponding answers thereto.

In one embodiment, datasets of questions and answers may be distinguished by the content ID from each other. For instance, a dataset of questions and answers may be represented by "Content ID: A." The content ID may be selected by the user or may be randomly selected by the memory assist server 110. In another embodiment, the datasets of the questions and answers may be distinguished from one another by the content ID, the chapter ID, and the level. For example, a dataset of questions and answers may be represented as "Content ID: A, Chapter ID: 1, and Level: 1." The content ID, the chapter ID, and the level may be selected by the user or may be randomly selected by the memory assist server 110.

In one embodiment, the user terminal 120 may output to the user the dataset of questions and answers received from the memory assist server 110 based on a predetermined rule and implement a test thereabout. The test, for example, may be implemented by means of a test format, such as a game. The test format may be selected by the user.

In an embodiment, the content mediator 117 may mediate a transaction about the content, the test format, or the like between the user terminal 112 and the external affiliated server 130. The external affiliated server 130, for example, may be a server, such as of a publishing company, an academy, or the like that provides a content about English proficiency tests, such as TOEIC and TOEFL, or a college entrance exam. Also, the external affiliated server 130, for instance, may be a server of a company which generates and provides a game suitable for memorization learning in a variety of test formats. According to an embodiment, the user may be given a license about the content and/or the test format provided by the external affiliated server 130. Also, according to an embodiment, a transaction activity, such as selling where transfer of a propriety right about the content and/or the test format is accompanied, may be done.

According to an embodiment of the present invention, earnings may be made from a subscription service for the content and/or the test format. Moreover, in an embodiment of the present invention, a profit may be made from the mediation service for the transaction activity through the external affiliated server 130. In an embodiment, the memory assist server 110 may include the content business portion 118 that distributes and manages the aforementioned earnings or the profit.

The content business portion 118 may grant the right to use the learning platform 100 to the user terminal 120 that has signed up for the subscription service and paid the subscription fee. Herein, the content business portion 118 may set a subscription fee according to a subscription plan, e.g., monthly, yearly, and transmit the set fee to the user terminal 120 to be paid in the form of electronic payment, such as in cryptocurrency. In an embodiment of the present invention, the right to use the paid content or the paid test format may be granted only to the user terminal 120 for which a payment has been made.

In one embodiment, the content storage 116, for instance, may store at least one or more contents provided through the external affiliated server 130.

In one embodiment, the content business portion 118 may manage a revenue generated through the contents and test formats. In one embodiment, the content business portion 118 may distribute the revenue to the external affiliated server 130 based on a revenue distribution rule after subtraction of a certain fee from the revenue.

In one embodiment, when the content and test format are selected, the user may proceed with a test about the dataset of questions and answers through the user terminal 120. The user terminal 120 may output questions included in the dataset of questions and answers in a predefined order and may receive a response to the questions from the user. In one embodiment, the user's response may be sent to the memory assist server 110 and may be graded by the memory assist server 110. For instance, the memory assist server 110 may determine whether the received response is correct. As another example, the memory assist server 110 may receive a scoring result for the dataset of questions and answers from the user terminal 120.

In one embodiment, the memory assist server 110 may generate learning data of incorrect answers based on the graded or scoring result in case where not all questions are answered correctly or in case where the number of the questions answered correctly are less than a preset number. For example, when the user gets three questions incorrect out of ten questions in the dataset of questions and answers, the memory assist server 110 may create the learning data of incorrect answers using the three questions that the user has failed to provide correct answers.

The memory assist server 110 may provide the user terminal 120 with the learning data of incorrect answers. When the user terminal 120 receives the learning data of incorrect answers from the memory assist server 110 and completes learning for the incorrect questions for a preset time, the user may repeat the test regarding the learning data of incorrect answers. This makes the user stimulated so that concentration can be maximized.

In one embodiment, the memory assist server 110 may repeat the learning and the test about the learning data of incorrect questions until all questions are correct or the number of the questions that is answered correctly becomes equal to or greater than the preset number. As an example, the learning and the test about the incorrect answers after a second trial or later may only involve the incorrect answers from the prior test.

In an embodiment, the memory assist server 110 may determine, based on the graded or scoring result, that learning about a particular dataset of questions and answers is completed when all questions in the dataset of questions and answers are correctly answered or the number of the questions that is answered correctly coincides with the preset number or becomes greater.

The memory assist server 110 may calculate the memory retention rate of the dataset of questions and answers to stimulate the user to do a review thereon. Generally, memory retention refers to an ability to remember information over a period of time. Herein, the memory retention rate may mean how much information the user has obtained from a learning trial is remembered by the user after a period of time. In an embodiment, the memory assist server 110 may provide the user terminal 120 with the memory retention rate of the dataset of questions and answers based on time passed after completion of the learning trial if any one of the learning trials is completed. Moreover, the memory assist server 110 may send to the user terminal 120 an alarm signal notifying that time to review the dataset of questions and answers has come when the memory retention rate reaches a predefined threshold.

Figure 2:
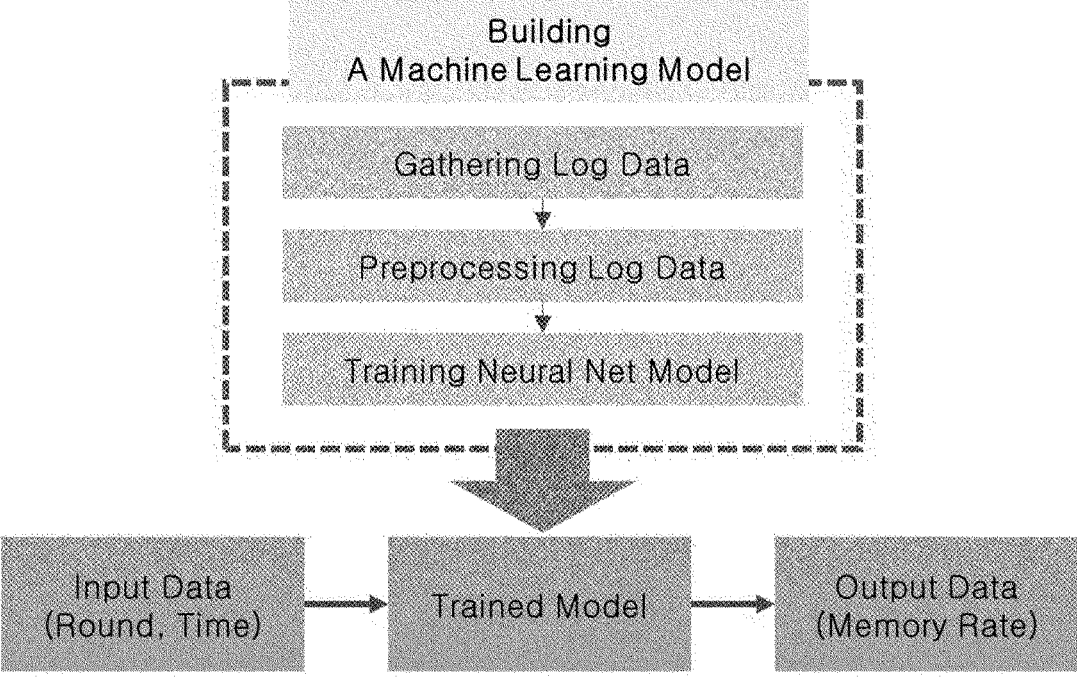
FIG. 2 is a flow chart illustrating a process of building a machine learning model regarding a memory retention rate according to an embodiment of the present invention.

FIG. 2 is a flow diagram that illustrates a process of generating a machine learning model regarding the memory retention rate according to an embodiment of the present invention. In an embodiment, the memory assist server 110 may generate the machine learning model for computing the memory retention rate using an artificial neural network that has already been known in the art.

In one embodiment, the memory assist server 110 may collect log data from the user terminal 120 when a test is completed in the user terminal 120. The memory assist server 110 may pre-process the collected log data and then extract learning data including a percentage of correct answers in the dataset of questions and answers as a feature. The memory assist server 110 may train the artificial neural network with the extracted learning data. Subsequently, the memory assist server 110 may enter input data transmitted from the user terminal 120 to the learned artificial neural network to compute the memory retention rate.

Figure 4:
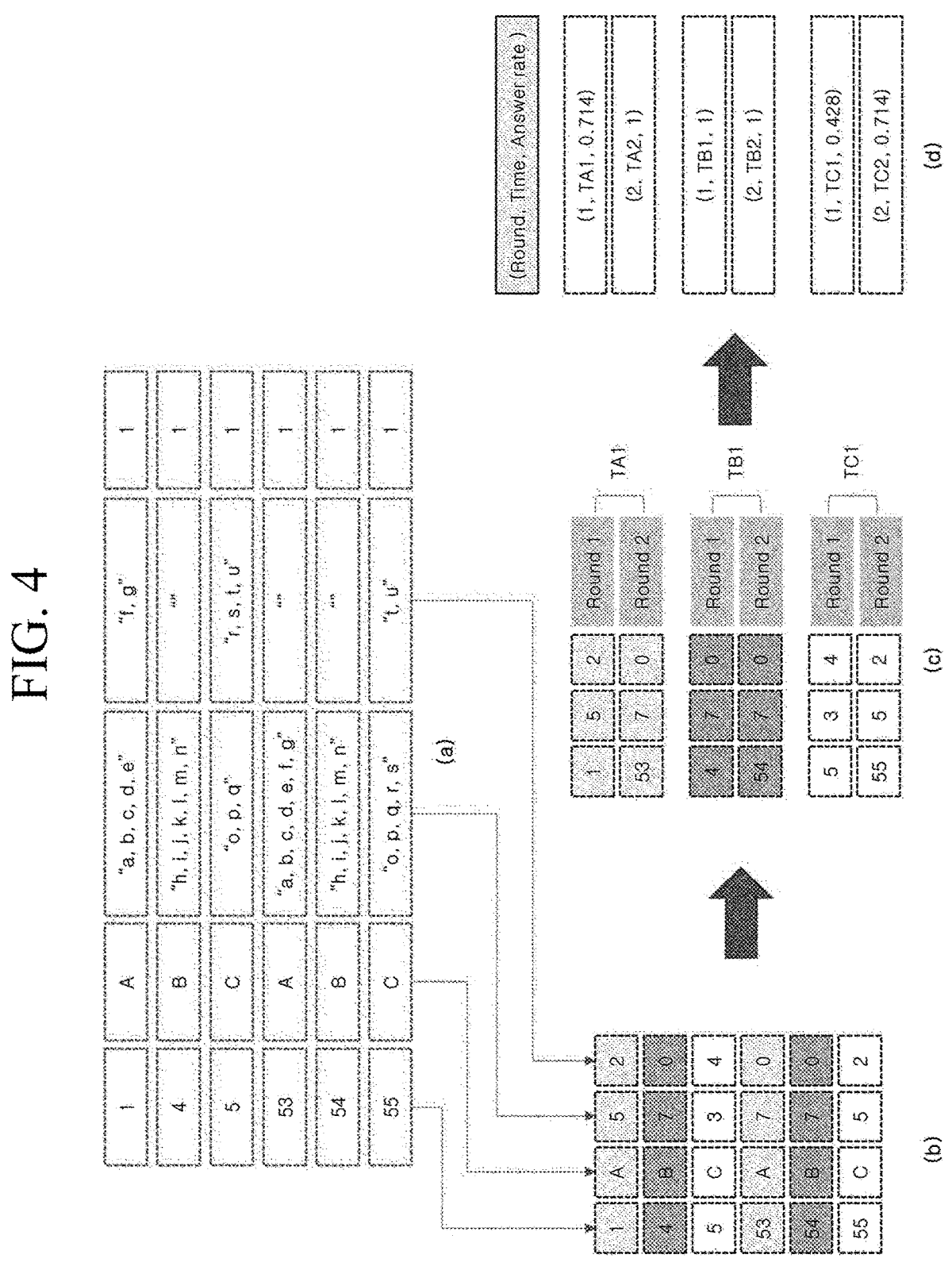

FIGS. 3 and 4 describe examples depicting the process of obtaining and pre-processing the learning data according to an embodiment of the present invention. Referring to FIGS.

3 and 4, the memory assist server 110 may collect the log data associated with the dataset of questions and answers every time a test is finished in the user terminal 120. More specifically, the log data collector 111 may receive the log data from the user terminal 120 through wired or wireless communication.

FIG. 3 illustrates an example for describing the log data collected by the log data collector 111. Referring to FIG. 3, the log data may comprise: i) a content ID about the dataset of questions and answers. Also, the log data may comprise ii) correct answers answered correctly in the dataset of questions and answers, iii) incorrect answers answered incorrectly in the dataset of questions and answers, iv) the number of steps that has been tried by the user on the dataset of questions and answers, or the like. The log data may further comprise a number which denotes an order of the log data collected by the log data collector 111.

In an embodiment, the data pre-processor 112 may extract the learning data from the log data. Referring to FIGS. 3, 4A, 4B, 4C, and 4D, the data pre-processor 112 may obtain the learning data as follows.

At a first step, a first pre-processed data is obtained by filtering the log data to only take log data points where the number of steps is identical. Preferably, the number of steps is one, which allows the log data related to the learning and testing of incorrect answers to be removed from consideration.

At a second step, a second pre-processed data is prepared by converting the correct answers and the incorrect answers in the first pre-processed data into corresponding numbers, respectively. For instance, as "a, b, c, d, e" presented in the first row and the third column in FIG. 4A represents that the number of correct answers is 5, "5" is obtained. This process may be identically applied in case of incorrect answers. For example, "f, g" presented in the first row and the fourth column in FIG. 4A represents that the number of incorrect answers is 2, so "2" is obtained.

In an embodiment, at a third step, second pre-processed data points having the same content ID in the second pre-processed data are grouped together. For example, as the content ID is A in rows with Number 1 and Number 53, they may be grouped together.

An order R of learning trials of the dataset of questions and answers may be set through an order of the rows with respect to each group in the second pre-processed data. For instance, in FIG. 4C, the first row among rows in each group may indicate a first learning trial (Round 1) regarding a particular dataset of questions and answers. The second row among each of the grouped rows indicates a second learning trial (Round 2) in FIG. 4C. The rows in each group may be preferably sorted depending on which was collected first or the above-described sequence.

At a fourth step, the learning data including a percentage of correct answers in the second pre-processed data is prepared. The percentage of correct answers is a value of the number of correct answers divided by a sum of the number of correct answers and the number of incorrect answers.

Referring to FIG. 4D, the learning data may further include the order R of learning trials of the dataset of questions and answers. In an embodiment, the learning data may further comprise i) the order R of learning trials of the dataset of questions and answers and ii) an elapsed time T calculated by the difference between a point in time when an n-th learning trial is completed and a point in time when an (n+1) learning trial, which is a subsequent to the n-th learning trial is completed, where n is an integer.

For instance, referring to the first row and first column of FIG. 4D, "1" in (1, TA1, 0.714) means a first learning trial. Also, "TA1" indicates the elapsed time T calculated by the difference between a completion time of the first learning trial and a completion time of a second learning trial. "0.714" means a value obtained by dividing 5 (the number of correct answers) by 7 (the sum of the number of correct answers and the number of incorrect answers). Referring to the first row and the second column of FIG. 4D, "2" in (2, TA2, 1) indicates the second learning trial. "TA2" indicates the elapsed time T calculated by the difference between the completion time of the second learning trial and a completion time of a third learning trial. In an embodiment, the elapsed time T may be a value where a time measured in minutes is divided by a certain value. In one embodiment, the certain value may preferably be 5. The elapsed time may be a number rounded to an integer.

Figure 6:
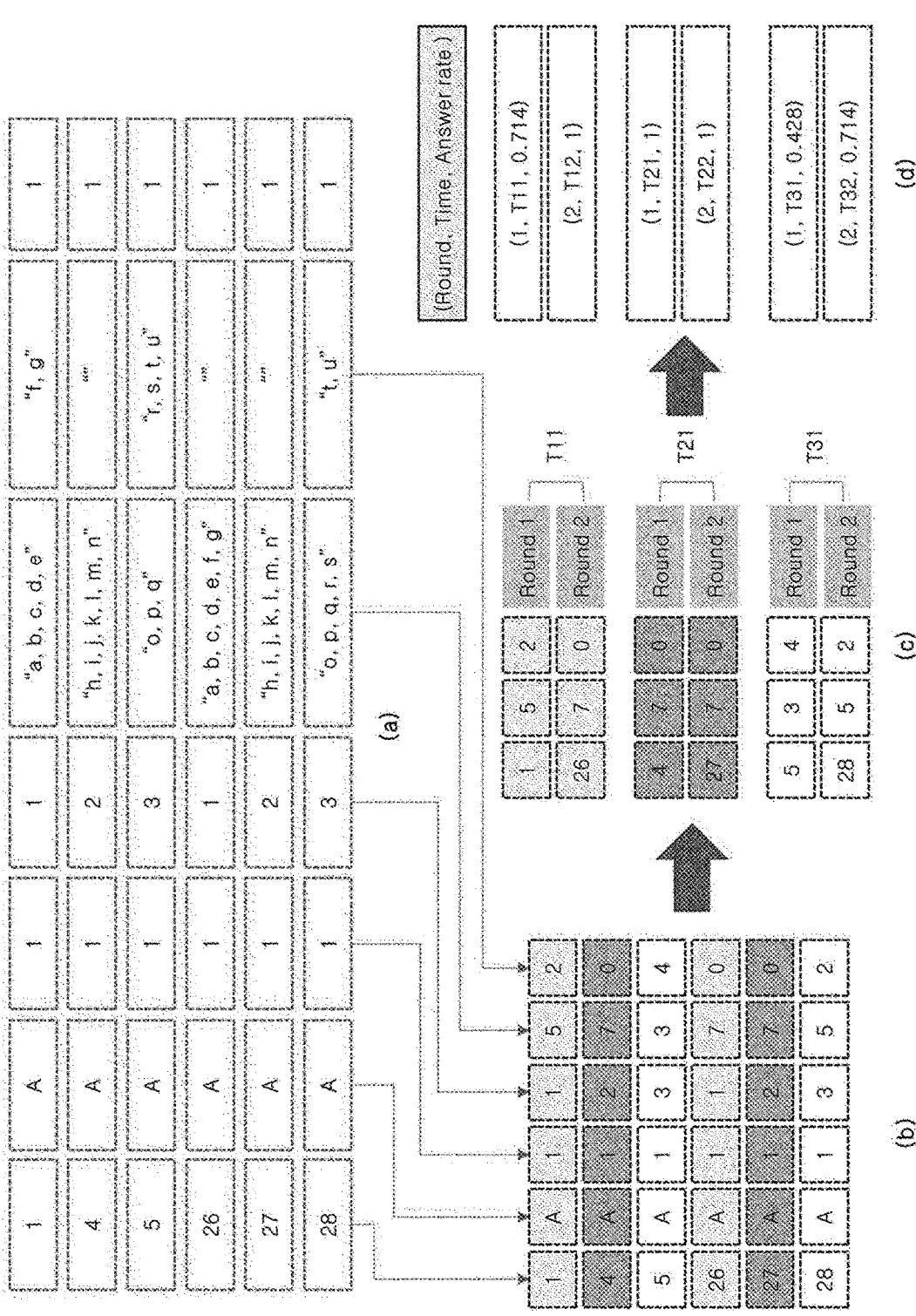

FIGS. 5 and 6 illustrate an example of describing the process of obtaining and pre-processing the learning data. Referring to FIG. 5, the log data may further include the level and the chapter ID of the dataset of questions and answers.

Referring to FIGS. 6A, 6B, 6C, and 6D, the data pre-processor 112 may extract the learning data as follows.

Since the first step, the second step and the fourth step may be performed in a same manner, description thereabout is omitted. In another embodiment, at the third step, second pre-processed data points in the second pre-processed data, which have the same content ID, the chapter ID and the level are grouped together. For instance, the rows where the number is 1 and 26 have the content ID of A, the chapter ID of 1, and the level 1, which are all the same, may be grouped together.

According to the learning data according to an embodiment, a public memory retention rate and an individual memory retention rate may be further included, which enhances an accuracy of the memory retention rate calculated by the artificial neural network.

In an embodiment, the learning data may further include the public memory retention rate which may reflect a pattern of the memory retention rate of other users in the process of training the artificial neural network. The public memory retention rate may be a median of percentages of correct answers in a dataset of questions and answers by a plurality of users when the content ID and the steps are all identical. Here, each of the plurality of users indicates one who has taken a test more than once. The number of steps may preferably be one. In another embodiment, the public memory retention rate may be a median of the percentages of correct answers by each user about a dataset of questions and answers when the contents ID, the chapter ID, the level and the number of steps are all the same in a group of users who take the test more than once.

In an embodiment, the learning data may further comprise the individual memory retention rate. This may reflect a tendency of the memory retention rate of an individual whose memory retention rate is to be calculated in the process of training the artificial neural network. In an embodiment, the individual memory retention rate may be a median of percentages of correct answers about a dataset of questions and answers when the test is taken at least more than once and the order of learning trials is same.

Moreover, the log data collector 111 may comprise the log data further including the user ID. The data pre-processor 112 may extract the learning data in a way of including the step of grouping data points in the second pre-processed data for each user ID, in place of the above-described third step according to an embodiment.

In one embodiment, the data pre-processor 112 may further include, after the fourth step, a fifth step where the order R of learning trials and the elapsed time T in the learning data are converted to an inverse thereof, respectively. The learning data may include an inverse $1/R$ of the order of the learning trial, an inverse $1/T$ of the elapsed time, and a percentage of correct answers. As a result, the learning data may have a value which is greater than 0 and 1 or less. The artificial neural network may be effectively trained by defining a numerical range of the learning data to a specific range.

The machine learning portion 113 may train the artificial neural network by inputting the learning data. In an embodiment, the artificial neural network may preferably be Deep Neural Network (DNN). In an embodiment, a framework for implementing the artificial neural network may preferably be TensorFlow. TensorFlow is a machine learning library developed in 2011 and disclosed as an open source in 2015 by Google.

In an embodiment, the artificial neural network may include an input layer receiving the learning data, an output layer outputting output data (memory retention rate) corresponding to the input data, a plurality of hidden layers performing calculation of an activation function between the input layer and the output layer, and the like. In an embodiment, the artificial neural network performs feedback learning by adjusting a parameter such that an error in calculating the memory retention rate can be minimized.

In an embodiment, the input data generator 114 may generate the input data when the user terminal 120 accessing the memory assist server 120 completes a learning trial about the dataset of questions and answers. The input data includes i) an order R' of the learning trial about the dataset of questions and answers and ii) an elapsed time T' that has elapsed since the completion of the learning trial R'.

In an embodiment, the elapsed time T' may be a value obtained from a measured time in minutes, divided by a certain value. Here, as the elapsed time T' may be obtained in a similar manner as the elapsed time T that is described above, repeated description is omitted.

In an embodiment, the input data generator 114 may change the input data such that the input data may have a value which is greater than 0 and 1 or less. In other words, the input data may include i) an inverse $1/R'$ of the order of the learning trial and ii) an inverse $1/T'$ of the elapsed time.

The calculator of memory retention rate 115 may compute the memory retention rate by inputting the input data to the artificial neural network trained by the machine learning portion 113. The memory retention rate may be computed for each dataset of questions and answers that is distinguished by the content ID. However, the memory retention rate may be calculated for each dataset of questions and answers that is distinguished by the content ID and the chapter ID. On the other hand, the memory retention rate may be calculated for each dataset of questions and answers that is distinguished by the content ID, the chapter ID, and the level. In an embodiment, the memory retention rate may be provided to the user in a form of percentile % or a statistical graph that compares the memory retention rate of the user with the memory retention rate of other users.

In another embodiment, the memory retention rate may be prepared for each predefined time interval, e.g., daily, to provide to the user in a form of a graph of memory retention rate versus time. The graph of the memory retention rate versus time may have a shape similar to an Ebbinghaus forgetting curve. The memory retention rate may be provided to the user as a graph of the memory retention rate versus time in a group, wherein the group includes users who have completed at least a first learning trial about the dataset of questions and answers.

The memory retention rate in the present learning platform 100 may be provided to the user in various formats and may stimulate the user to review by inducing competition against other users. Furthermore, the present learning platform 100 allows a user to do less work about a part where the user has a high memory retention rate in a learning trial but to do more work about a part where the user has a low memory retention rate, thereby enabling metacognition learning.

It will be apparent to a person having ordinary skill in the art that the present disclosure described above is not limited to those described. Modifications can be made within the scope of the claims.

What is claimed is:

1. A learning platform for obtaining a memory retention rate using machine learning, comprising a memory assist server configured to:

generate a dataset of questions and answers comprising one or more question-and-answer pairs;

collect log data from a user terminal corresponding to the dataset of questions and answers, wherein the log data includes:

1) A content identification (ID) identifying a type of a content, 2) correct answers, 3) incorrect answers, and 4) a number of steps that a user has tried on the dataset;

extract a first pre-processed data by filtering the log data to only obtain data points where the number of steps is identical;

obtain a second pre-processed data by converting the correct answers and the incorrect answers in the first pre-processed data into their respective counts;

group the second pre-processed data points having the same content ID;

extract learning data including a percentage of correct answers from the grouped second pre-processed data, wherein the learning data further comprises i) an order R of learning trials of the dataset of questions and answers, and ii) an elapsed time T calculated by a difference between a completion time of an n-th learning trial (R) and a completion time of an (n+1)-th learning trial, wherein n is a positive integer;

convert the order R of learning trials and the elapsed time T in the learning data to their respective inverses;

train an artificial neural network using the learning data; and calculate a memory retention rate of the dataset of questions and answers using the trained artificial neural network.

2. The learning platform of claim 1, wherein the learning data further includes a public memory retention rate, wherein the public memory retention rate is a median of percentages of correct answers about the dataset of questions and answers by a plurality of users when the content ID and the steps are all identical, wherein each of the plurality of users indicates one who has taken a test more than once.

3. The learning platform of claim 1, wherein the memory assist server further includes:

an input data generator generating input data about the dataset of questions and answers when the user terminal connects to the memory assist server; and a memory calculator inputting the input data to the artificial neural network trained by a machine learning portion to calculate the memory retention rate.

4. The learning platform of claim 3, wherein the input data includes: i) an order R' of a learning trial of the dataset of questions and answers and ii) an elapsed time T' that has elapsed since a completion time of the learning trial.

* * * * *